(12) United States Patent
Lauwers et al.

(10) Patent No.: US 10,165,726 B2
(45) Date of Patent: Jan. 1, 2019

(54) AGRICULTURAL HEADER WITH MULTIPLE KNIFE DRIVES

(71) Applicant: CNH Industrial America LLC, New Holland, PA (US)

(72) Inventors: Andrew V. Lauwers, Stevens, PA (US); Blaine R. Noll, Fleetwood, PA (US); Joshua Joyce, Lititz, PA (US); John J. Conroy, Ephrata, PA (US); Zachary Long, Harleysville, PA (US); Craig D. Roberts, Denver, PA (US); James F. Rayfield, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 67 days.

(21) Appl. No.: 15/389,664

(22) Filed: Dec. 23, 2016

(65) Prior Publication Data
US 2018/0177121 A1    Jun. 28, 2018

(51) Int. Cl.
| | | |
|---|---|---|
| *A01D 34/30* | (2006.01) | |
| *A01D 34/04* | (2006.01) | |
| *A01D 41/06* | (2006.01) | |
| *A01D 101/00* | (2006.01) | |

(52) U.S. Cl.
CPC ............. *A01D 34/30* (2013.01); *A01D 34/04* (2013.01); *A01D 41/06* (2013.01); *A01D 2101/00* (2013.01)

(58) Field of Classification Search
CPC ...... A01D 34/30; A01D 34/145; A01D 34/02; A01D 41/144; A01D 34/14; A01D 34/04; A01D 41/14
See application file for complete search history.

(56) References Cited

U.S. PATENT DOCUMENTS

| | | | |
|---|---|---|---|
| 3,577,716 A | 5/1971 | McCarty | |
| 4,067,179 A * | 1/1978 | Schneider | A01D 34/30 56/297 |
| 4,409,780 A | 10/1983 | Beougher et al. | |
| 4,487,004 A * | 12/1984 | Kejr | A01D 41/14 56/14.4 |
| 6,962,040 B2 | 11/2005 | Talbot | |
| 7,520,118 B1 * | 4/2009 | Priepke | A01D 34/30 56/257 |
| 7,658,059 B2 | 2/2010 | Majkrzak | |
| 7,730,709 B2 | 6/2010 | Priepke | |
| 7,805,919 B2 * | 10/2010 | Priepke | A01D 41/142 56/257 |
| 7,810,304 B2 | 10/2010 | Priepke | |
| 8,011,272 B1 | 9/2011 | Bich et al. | |

(Continued)

FOREIGN PATENT DOCUMENTS

DE       103 16 003 A1    7/2005

*Primary Examiner* — Arpad Fabian-Kovacs
(74) *Attorney, Agent, or Firm* — Peter K. Zacharias; Patrick M. Sheldrake (57) ABSTRACT

An agricultural vehicle that includes a chassis and a header with at least three header frames, including a center section, a first wing section, and a second wing section carried by the chassis. The header includes: at least three knife assemblies; and at least three knife drives, each of the knife drives being drivingly coupled to at least one of the at least three knife assemblies.

18 Claims, 6 Drawing Sheets

(56) References Cited

U.S. PATENT DOCUMENTS

| | | | | |
|---|---|---|---|---|
| 8,087,224 | B1* | 1/2012 | Coers | A01D 41/144 |
| | | | | 56/153 |
| 9,532,502 | B2* | 1/2017 | Cook | A01D 34/30 |
| 9,668,407 | B2* | 6/2017 | Cook | A01D 34/02 |
| 9,918,430 | B2* | 3/2018 | Roberge | A01D 41/144 |
| 2003/0217537 | A1* | 11/2003 | Schlesser | A01B 73/067 |
| | | | | 56/14.9 |
| 2008/0148701 | A1* | 6/2008 | Priepke | A01D 34/145 |
| | | | | 56/17.6 |
| 2009/0145097 | A1* | 6/2009 | Priepke | A01D 34/30 |
| | | | | 56/257 |
| 2009/0145264 | A1* | 6/2009 | Priepke | A01D 34/30 |
| | | | | 74/84 R |
| 2014/0130472 | A1* | 5/2014 | Cook | A01D 34/30 |
| | | | | 56/16.4 R |
| 2014/0190139 | A1* | 7/2014 | Cook | A01D 34/145 |
| | | | | 56/10.1 |
| 2014/0245713 | A1 | 9/2014 | Cook | |
| 2014/0345239 | A1* | 11/2014 | Cook | A01D 34/145 |
| | | | | 56/10.1 |
| 2015/0163994 | A1* | 6/2015 | Bich | A01D 34/14 |
| | | | | 56/299 |
| 2015/0216121 | A1* | 8/2015 | Roberge | A01D 41/144 |
| | | | | 56/14.7 |
| 2015/0305233 | A1* | 10/2015 | Surmann | A01D 34/135 |
| | | | | 56/10.1 |
| 2016/0262301 | A1* | 9/2016 | van Vooren | A01D 41/144 |
| 2017/0265383 | A1* | 9/2017 | Cook | A01D 34/02 |

* cited by examiner

AGRICULTURAL HEADER WITH MULTIPLE KNIFE DRIVES

FIELD OF THE INVENTION

The present invention relates to agricultural vehicles, and, more particularly, to agricultural vehicles including headers.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

Typically, the header includes one or more knife assemblies, which can form portions of cutter bars, which cut the crop material growing in the field for collection. The knife assemblies together often define widths close to the largest width of the combine, relative to forward motion, in order to cut as much crop material as possible in each pass of the combine in the field. As combines become larger to reduce the number of passes necessary to harvest an entire field, the headers have also increased dramatically in width. While this is beneficial during crop collection in the field, increasing the width of the header has accompanying technical challenges.

One particular challenge faced by increasing header widths is increasing loads on the system driving the knife assemblies. As is known, the knife assemblies are typically driven in a reciprocating manner with a relatively high frequency, which can produce significant stress and vibration on the knife assemblies as well as the knife drive system reciprocating the knife assemblies. As headers become wider, the knife assemblies also become wider, which increases the stress and vibration that can occur on components of the knife assemblies and knife drive system due to the increased weight of the knife assemblies. One possible solution to reduce stress and vibration caused by increasing knife assembly width is lowering the weight of the knife assemblies, but this can cause knife assembly durability issues. Further, the power requirements for driving such large knife assemblies also increase, requiring a larger gearbox in the knife drive system to handle the input power and reciprocate the knife assemblies, which can limit the design options of other header components due to the limited space in the area of the header where the gearbox typically resides.

What is needed in the art is a header which can scale to a larger width while avoiding some of the issues associated with scaling up the width of known headers.

SUMMARY OF THE INVENTION

In accordance with an aspect of the present invention, there is provided a header which includes at least three knife drives each drivingly coupled to one or more knife assemblies of the header.

In accordance with another aspect of the present invention, there is provided an agricultural vehicle including a chassis and a header carried by the chassis. The header includes: at least three knife assemblies; and at least three knife drives, each of the knife drives being drivingly coupled to at least one of the at least three knife assemblies.

In accordance with yet another aspect of the present invention, there is provided a header for an agricultural vehicle including: a header frame; at least three knife assemblies supported by the header frame; and at least three knife drives supported by the header frame, each of the knife drives being drivingly coupled to at least one of the at least three knife assemblies.

An advantage of the agricultural vehicle and header described herein is that having three or more knife drives which can drive the knife assemblies allows for the width of the header to increase while reducing the risk of producing too much stress in each knife drive during operation.

Another advantage of the agricultural vehicle and header described herein is that having three or more knife drives reduces the power requirement to drive each individual knife assembly and can allow for a reduction in the size of the knife drives.

Still another advantage of the agricultural vehicle and header described herein is that having three or more knife drives can make it easier to balance the knife assemblies during use, reducing the stress and vibrations that can prematurely wear down components of the header.

Still another advantage of the agricultural vehicle and header described herein is that having three or more knife drives can make it easier for the knife assemblies to have a break point to allow folding of the header.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

DETAILED DESCRIPTION OF THE INVENTION

Figure 1:
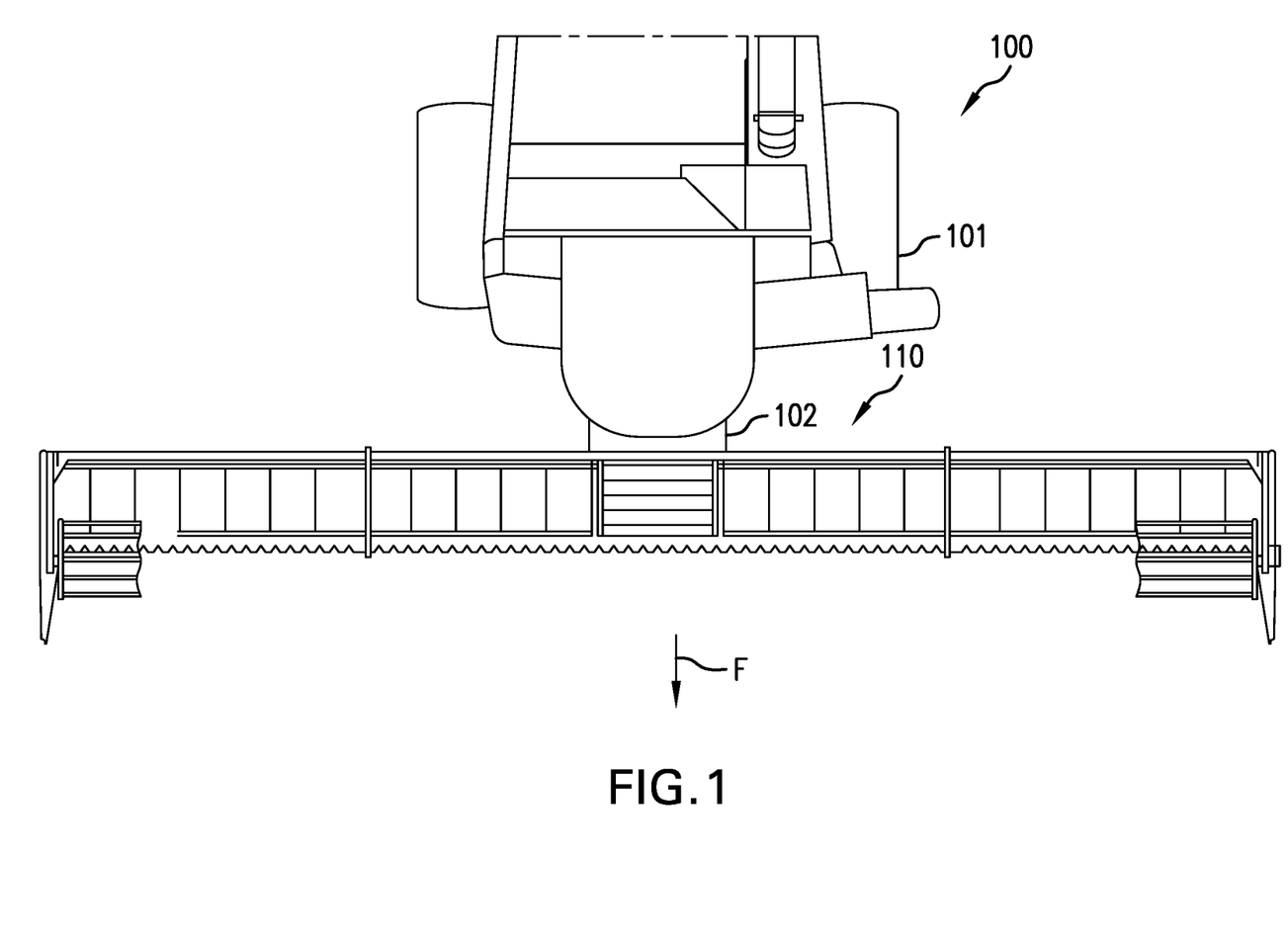
FIG. 1 is a top view of an agricultural vehicle, in accordance with an exemplary embodiment of the present invention.

Referring now to the drawings, and more particularly to FIG. 1, there is shown an exemplary embodiment of an agricultural vehicle 100 in the form of a combine harvester which generally includes a chassis 101 and a header 110 carried by the chassis 101 during movement of the harvester 100 in, for example, a forward direction, illustrated as arrow F, in accordance with an exemplary embodiment of the present invention. The header 110 can be connected to the chassis 101 by, for example, a mount 102 which rigidly connects the header 110 to the chassis 101, but a rigid connection is optional and any manner of connecting the header 110 to the chassis 101 may be utilized. Typically, the harvester 100 will include additional systems for the separation and handling of collected crop material, but these additional systems are omitted from view for brevity of description. It should be appreciated that the header 110 described and illustrated herein does not necessarily need to be included on a combine harvester, but can be incorporated in other agricultural vehicles such as mowers.

Figure 2:
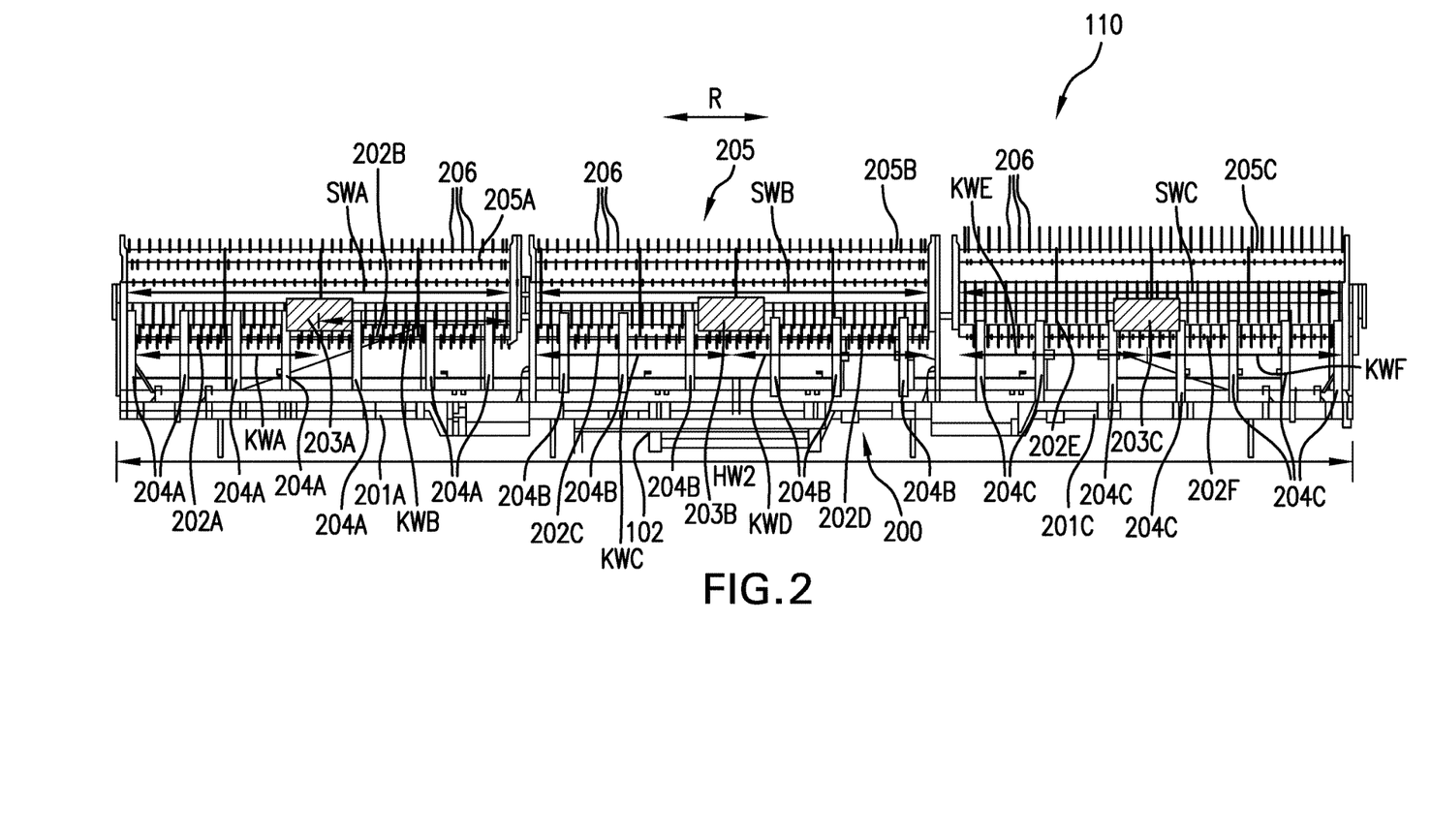
FIG. 2 is a bottom view of an exemplary embodiment of the header shown in FIG. 1.

Referring now to FIG. 2, an exemplary embodiment of the header 110 is shown in better detail. As can be seen, the header 110 can include a header frame 200 which is split into three distinct header frame sections 201A, 201B, 201C, with the header frame sections 201A, 201B, 201C together defining a header width HW2 of the header frame 200. The header frame 200 can be mounted to the harvester 100, for example, by connection between the previously described mount 102 and the header frame section 201B. Each header frame section 201A, 201B, 201C supports one or more knife assemblies 202A, 202B, 202C, 202D, 202E, 202F and a respective knife drive 203A, 203B, 203C drivingly coupled to the knife assemblies 202A, 202B, 202C, 202D, 202E, 202F so as to independently drive movement of the knife assemblies 202A, 202B, 202C, 202D, 202E, 202F and cut crop material the vehicle 100 travels. As shown, the knife drive 203A supported by the header frame section 201A independently drives knife assemblies 202A and 202B; the knife drive 203B supported by the header frame section 201B independently drives knife assemblies 202C and 202D; and the knife drive 203C supported by the header frame section 201C independently drives knife assemblies 202E and 202F. As used herein, each knife drive 203A, 203B, and 203C "independently" drives its respective knife assembly or assemblies in the sense that the knife drives 203A, 203B, and 203C do not act in concert to drive a single knife assembly. It should be appreciated that while each knife drive 203A, 203B, 203C is shown and described as drivingly coupled to a respective pair of knife assemblies 202A and 202B; 202C and 202D; and 202E and 202F, each knife drive 203A, 203B, 203C may only be drivingly coupled to one knife assembly or more than two knife assemblies. Each knife assembly 202A, 202B, 202C, 202D, 202E, 202F can be formed, for example, as a portion of a cutter bar having a plurality of knife edges (shown in FIG. 4) which can cut crop material as the knife assemblies 202A, 202B, 202C, 202D, 202E, 202F are driven by the knife drives 203A, 203B, 203C. Further, each of the knife assemblies 202A, 202B, 202C, 202D, 202E, 202F can be connected to one or more flex arms 204A, 204B, 204C which allow the knife assemblies 202A, 202B, 202C, 202D, 202E, 202F to flex during travel across a field, as is known, in order to conform to the field and maintain a constant distance from the ground of the field. A reel 205 including a plurality of tines 206 can also be pivotally connected to the header frame 200 and rotationally driven to move crop material toward the knife assemblies 202A, 202B, 202C, 202D, 202E, 202F. The reel 205 can be a single reel spanning the entire header width HW2 or a split reel, as shown, with multiple reel sections 205A, 205B, 205C each associated with a respective header frame section 201A, 201B, 201C. The flex arms 204A, 204B, 204C and the reel 205 can be configured to prevent contact of the reel 205 with any of the knife assemblies 202A, 202B, 202C, 202D, 202E, 202F as the vehicle 100 traverses a field, according to any suitable method.

As can be seen in FIG. 2, each header frame section 201A, 201B, 201C can define a respective frame section width SWA, SWB, and SWC, with the frame section width SWA, SWB, and SWC all being equal so the header frame 200 is split into three equal header frame sections 201A, 201B, 201C, i.e., the sum of the frame section widths SWA, SWB, and SWC is approximately equal to the header width HW2. Similarly, each of the knife assemblies 202A, 202B, 202C, 202D, 202E, 202F can define a respective knife width KWA, KWB, KWC, KWD, KWE, and KWF, with all of the knife widths KWA, KWB, KWC, KWD, KWE, and KWF being substantially equal. When the knife drives 203A, 203B, 203C are configured to reciprocatingly drive the knife assemblies 202A, 202B, 202C, 202D, 202E, 202F in a reciprocation direction, signified by arrow R, the knife widths KWA, KWB, KWC, KWD, KWE, and KWF being equal helps to balance the forces that are developed during the reciprocating motion of the knife assemblies 202A, 202B, 202C, 202D, 202E, 202F and reduce vibrations that are transmitted to the header frame sections 201A, 201B, 201C and, ultimately, the vehicle 100. However, there may be cases where the knife assemblies 202A, 202B, 202C, 202D, 202E, 202F do not have equal widths, which will be described further herein. In a configuration where all the knife assemblies 202A, 202B, 202C, 202D, 202E, 202F do not have equal widths, each of the pairs of knife assemblies 202A and 202B; 202C and 202D; and 202E and 202F drivingly coupled to a respective knife drive 203A, 203B, 203C can optionally include two knife assemblies with equal widths, so the reciprocating motion of the knife assemblies of the pair are balanced, with the respective knife drive commonly referred to as a "center knife drive" due to the knife drive being in the center of the two knife assemblies driven by the knife drive. Examples of center knife drives that can be incorporated in exemplary embodiments of the present invention are known from U.S. Pat. Nos. 7,730,709 and 7,810,304 to Priepke, which are incorporated herein by reference, as well as U.S. Pat. No. 8,011,272 to Bich et al., which is fully incorporated herein by reference and a portion of which is reproduced in FIG. 4 herein. Regardless of whether the knife drive assemblies 202A, 202B, 202C, 202D, 202E, 202F all have equal widths or not, the sum of the knife widths of each pair of knife assemblies will generally be equal or close to the respective width of the header frame section supporting the pair of knife assemblies. In other words, the sum of knife width KWA and KWB will generally be equal or close to SWA; the sum of knife width KWC and KWD will generally be equal or close to SWB; and the sum of knife width KWE and KWF will generally be equal or close to SWC. Further, to balance the reciprocating forces that develop during operation, the paired knife assemblies 202A and 202B can have a similar mass; the paired knife assemblies 202C and 202D can have a similar mass; and the paired knife assemblies 202E and 202F can have a similar mass.

Figure 3:
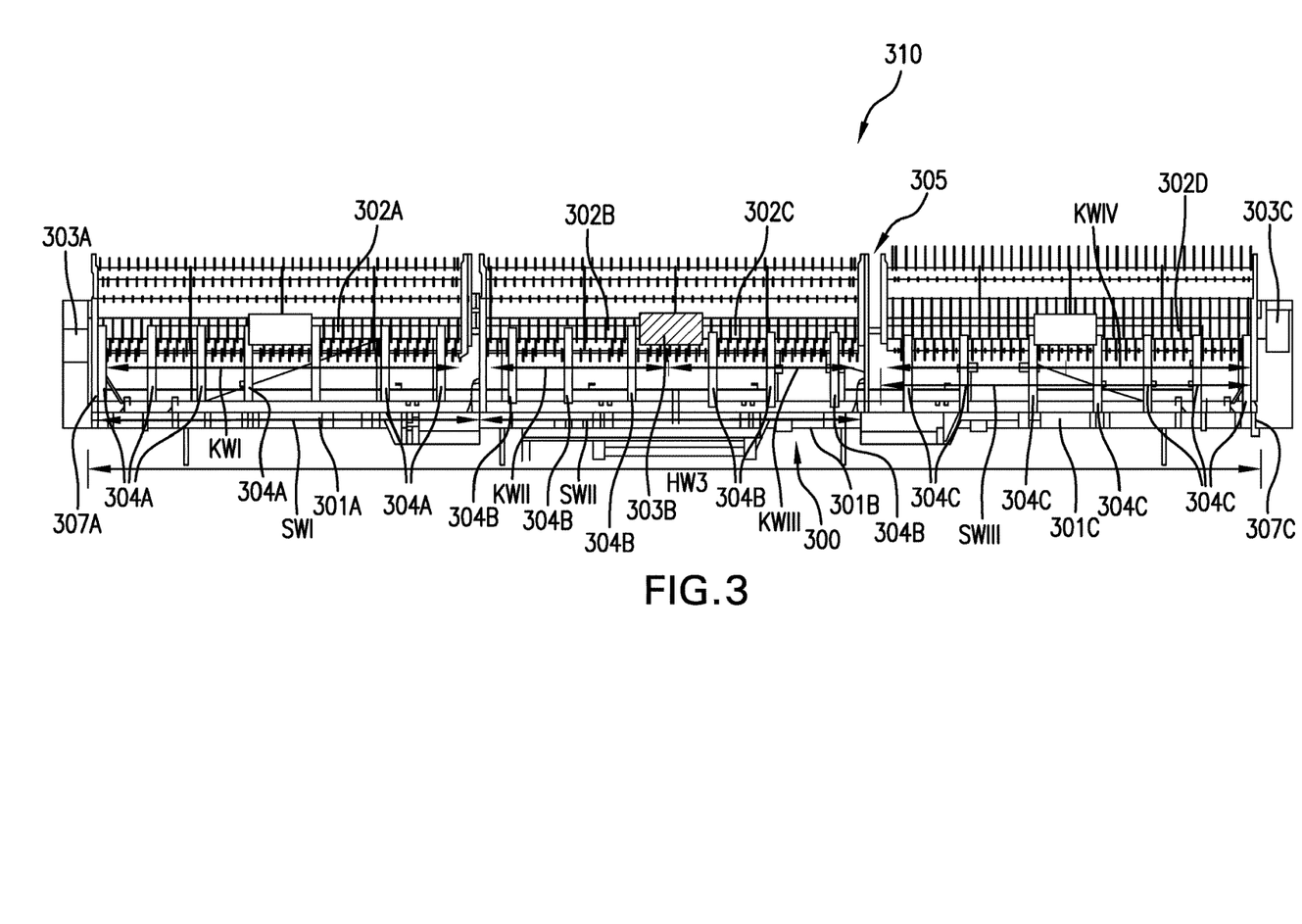
FIG. 3 is a bottom view of another exemplary embodiment of a header that can be incorporated in the agricultural vehicle shown in FIG. 1.

Referring now to FIG. 3, another exemplary embodiment of a header 310 formed in accordance with an aspect of the present invention is shown. Components of the header 310 which are similar to components of the header 110 shown in FIG. 2 are numbered similarly, with reference numerals that are raised by 100. As can be seen, the header 310 includes a header frame 300 with header frame sections 301A, 301B, 301C each supporting at least one knife assembly 302A, 302B, 302C, and 302D and at least one knife drive 303A, 303B, 303C which is drivingly coupled to at least one of the knife assemblies 302A, 302B, 302C, and 302D. However, unlike the previously described header 110, in which all of the knife drives 203A, 203B, and 203C were configured as center knife drives, the header 310 includes two knife drives 303A and 303C which are configured as so-called "end drives" due to residing at lateral outer ends 307A and 307C of the respective header frame sections 301A and 301C supporting the knife drives 303A and 303C. Such knife drives 303A and 303C can be formed, for example, as "wobble boxes" which are well-known in the art and transform rotational motion into reciprocating motion to drive the coupled knife assemblies 302A and 302D. Due to the configuration of the wobble boxes 303A and 303C, lateral sides of the header 310 are widened to accommodate and shield the wobble boxes 303A and 303C. The knife drive 303B, on the other hand, can be configured as a center knife drive, as previously discussed, to drive a pair of knife assemblies 302B and 302C. Similarly to header frame 200, the header frame sections 301A, 301B, and 301C can all have equal section widths SWI, SWII, and SWIII which together define an effective header width HW3 of the header 310, which does not include the width of the wobble boxes 303A and 303C. However, since the knife assemblies 302A and 302D can be the only knife assemblies driven by their respective knife drives 303A and 303C, the knife assemblies 302A and 302D can each have a knife width KWI and KWIV which is substantially equal to the respective section width SWI and SWIII of the header frame section 301A and 301C supporting the knife assemblies 302A, 302D. The knife widths KWI and KWIV can be substantially equal to balance the knife assemblies 302A and 302D and limit vibrations produced during reciprocating motion. The knife assemblies 302B and 302C, on the other hand, can each have respective knife widths KWII and KWIII which are equal to each other and are equal to the section width SWII of the header frame section 301B when added together. In this sense, the header 310 has a first pair of balanced knife assemblies 302A and 302D driven by end knife drives 303A and 303C and a second pair of balanced knife assemblies 302B and 302C driven by center knife drive 303B. Similarly to the header 110, the header 310 can also include one or more flex arms 304A, 304B, 304C connected to the knife assemblies 302A, 302B, 302C, and 302D and a reel 305, formed as either a single reel or split reel. It should be appreciated that the balanced knife assemblies 302A and 302D can have a substantially equal mass while the balanced knife assemblies 302B and 302C can also have a substantially equal mass in order to reduce vibrations and stress in the vehicle 100.

From the foregoing exemplary embodiments, it should be appreciated that having three or more knife drives can allow the width of the individual knife assemblies to be reduced while maintaining an equal width of the header. By reducing the relative width of the knife assemblies, each knife drive can be smaller in size, due to lower power requirements and potential stress from vibrations. Alternatively, a header provided with three knife drives which are the same size as a header with two knife drives can be used with knife assemblies having a greater weight so the overall weight of the knife assemblies being driven by three knife drives, in aggregate, is greater than the overall weight of the knife assemblies being driven by two knife drives. Such a configuration maintains the relative stress experienced by each of the three knife drives, compared to the stress experienced by two knife drives, but allows the knife assemblies to be formed of heavier material which can increase the durability of the knife assemblies. The overall width of the header can also be increased to a size greater than allowed by using two knife drives by utilizing three or more knife drives, as the stress experienced by the knife drives can serve to limit the width of the header.

Figure 4:
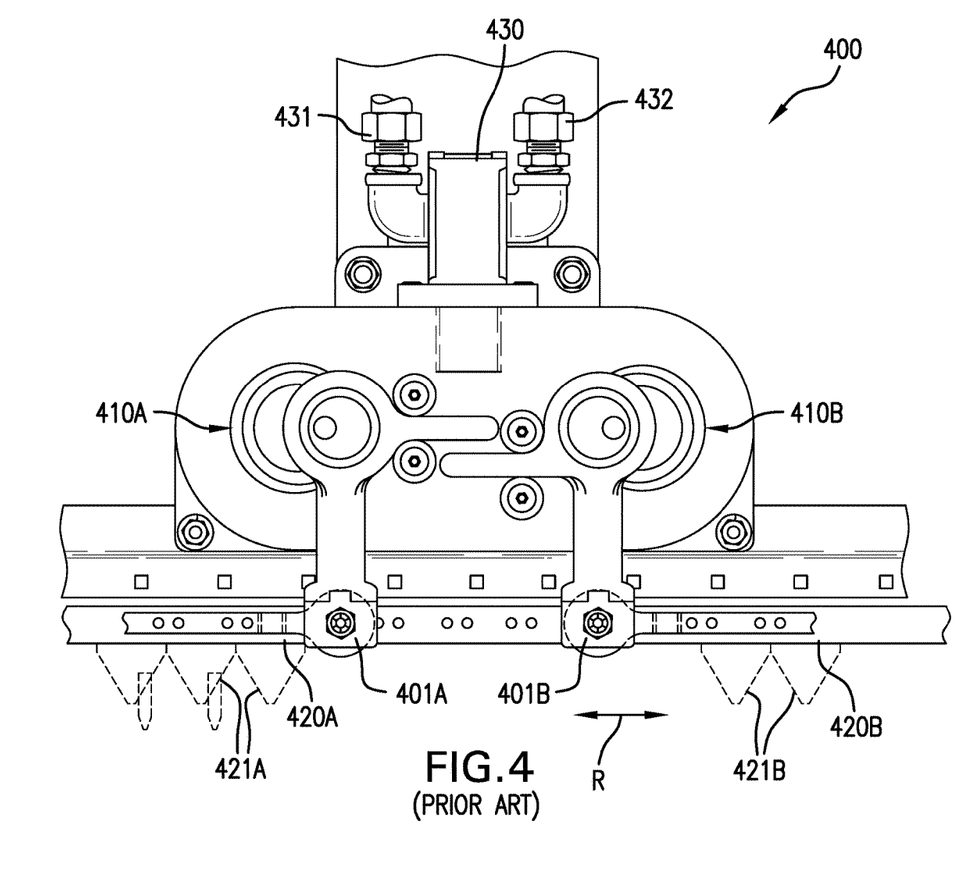
FIG. 4 is a top view of a prior art knife drive that can be incorporated in the exemplary embodiments of a header shown in FIGS. 2-3.

Referring now to FIG. 4, an exemplary embodiment of a center knife drive 400 known in the prior art from U.S. Pat. No. 8,011,272 to Bich et al. is shown to illustrate how exemplary embodiments in accordance with various aspects of the present invention can be configured. As can be seen, the center knife drive 400 can include a pair of epicyclical drives 410A, 410B which connect to a respective knife assembly 420A, 420B by a respective header driver element 401A, 401B. Each knife assembly 420A, 420B can be configured as part of a respective cutter bar assembly and include serrations or knife edges 421A, 421B that will sever crop material as the knife edges 421A, 421B reciprocate in a reciprocating direction R. The details of how the epicyclical drives 410A and 410B reciprocate knife assemblies 420A and 420B is thoroughly explained by U.S. Pat. No. 8,011,272 to Bich et al., and thus is omitted for the sake of brevity. The epicyclical drives 410A and 410B can be commonly driven by a fluid motor 430 which is connected to a source of pressurized fluid and a fluid reservoir (not shown) via fluid lines 431 and 432, as is known. It should be appreciated that the epicyclical drives 410A and 410B can also be driven by an alternative power sources, such as a PTO shaft or an electric motor, and that the fluid motor 430 is shown only as an exemplary way of driving the epicyclical drives 410A and 410B. It should be further appreciated that the center knife drive 400 shown in FIG. 4 is only one exemplary embodiment of a center knife drive that can be utilized according to aspects of the present invention, and other types of knife drives, either center and/or end drives, can be utilized according to various aspects of the present invention.

Figure 5:
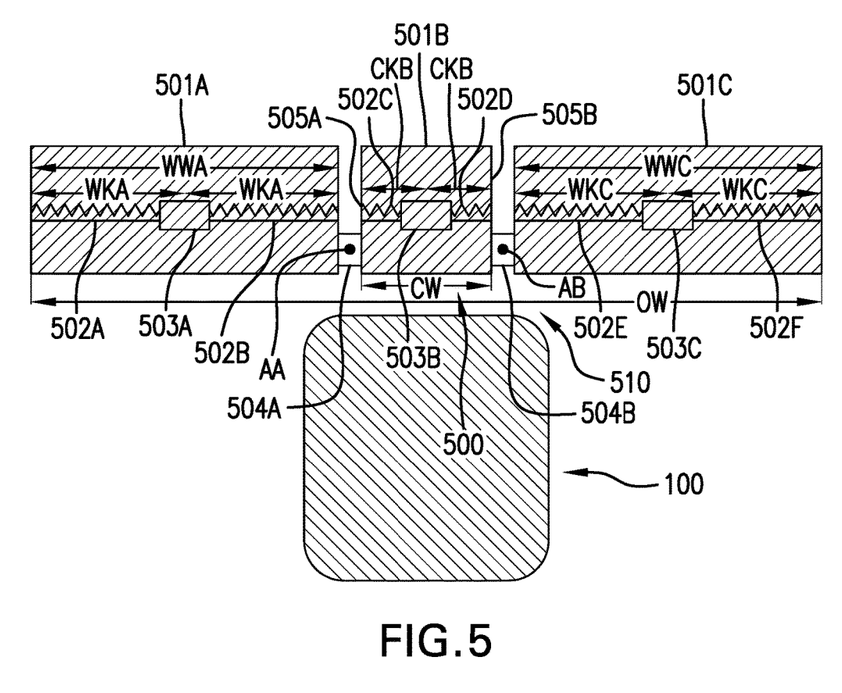
FIG. 5 is a schematic view of yet another exemplary embodiment of an agricultural vehicle in a harvesting mode.
Figure 6:
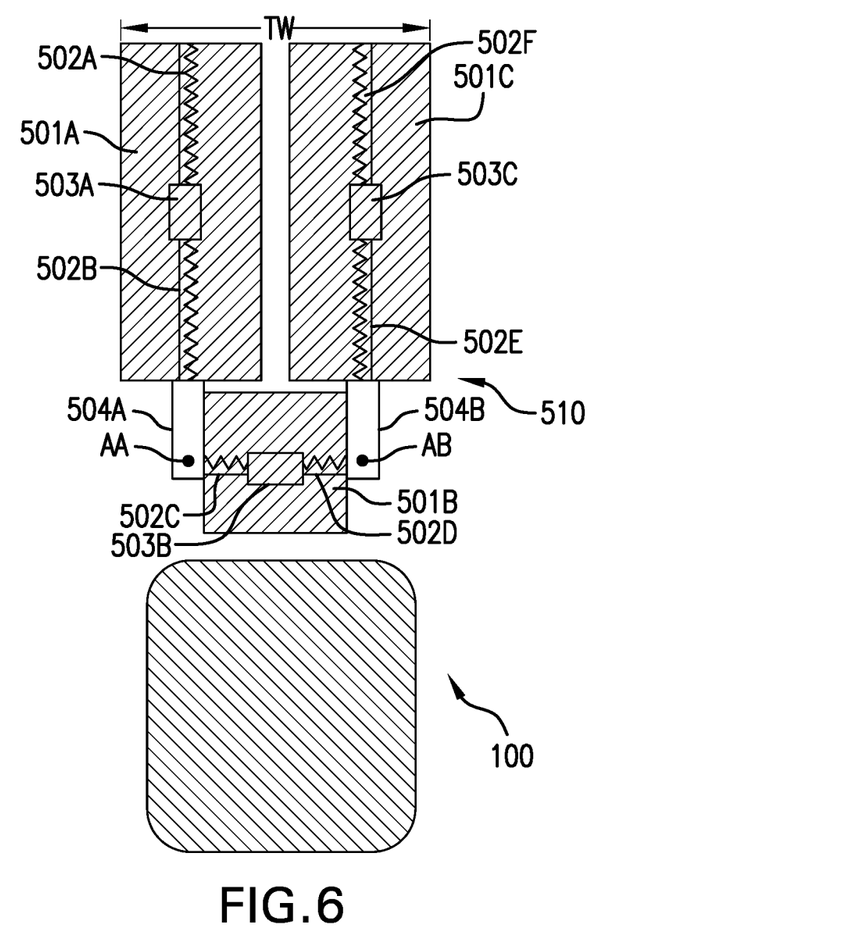
FIG. 6 is a schematic view of the agricultural vehicle shown in FIG. 5 in a transport mode.

Referring now to FIGS. 5 and 6, yet another exemplary embodiment of a header 510 which can be carried by the vehicle 100 and formed according to an aspect of the present invention is shown. As can be seen, the header 510 includes a header frame 500 which is split into three header frame sections 501A, 501B, 501C each carrying a pair of knife assemblies 502A, 502B, 502C, 502D, 502E, and 502F which are drivingly coupled to a respective center knife drive 503A, 503B, 503C. Unlike previously described headers, the header 510 has two header frame sections 501A and 501C, which can be referred to as first and second wing sections, defining wing widths WWA and WWC while the header frame section 501B, which can be referred to as a center section, defines a center width CW which is less than the wing widths WWA and WWC. Together, the widths WWA, WWC, and CW can define an operation width OW of the header 510, as shown, with the operation width OW of the header 510 shown in FIG. 5 being when the header 510 is in an operation position in order to cut crop material. The knife assemblies 502A, 502B, 502C, 502D, 502E, and 502F can be formed as a first pair of knife assemblies 502A and 502B carried by the first wing section 501A; a second pair of knife assemblies 502C and 502D carried by the center section 501B; and a third pair of knife assemblies 502E and 502F carried by the second wing section 501C. The knife assemblies 502A and 502B can each define an equal wing knife width WKA and the knife assemblies 502E and 502F can each define an equal wing knife width WKC which is equal to the wing knife width WKA of the knife assemblies 502A and 502B, with the sum of the wing knife widths WKA being equal to the first wing width WWA and the sum of the wing knife widths WKC being equal to the second wing width WWC. The knife assemblies 502C and 502D, on the other hand, can each define an equal center knife width CKB, with the sum of the center knife widths CKB being equal to the center width CW of the center section 501B. The center section 501B can also have a pair of opposite lateral ends 505A, 505B, with the wing sections 501A and 501C being connected to a respective lateral end 505A, 505B of the center section 501B by, for example, respective hinge assemblies 504A, 504B so the wing sections 501A and 501C can pivot relative to the center section 501B about vertical axes AA and AB defined by the hinge assemblies 504A, 504B.

Referring specifically now to FIG. 6, it can be seen that the wing sections 501A and 501C have pivoted about the vertical axes AA and AB so the header 510 assumes a transport position and has a transport width TW which is significantly less than the operation width OW of the header 510 shown in FIG. 5. By shifting the header 510 from the operation position to the transport position, the width of the header 510 can be reduced sufficiently to comply with public roadway regulations and allow the vehicle 100 to legally travel on public roadways. Once the vehicle 100 has reached the desired destination, the header 510 can be shifted back to the operation position to assume the operation width OW and cut crop material once again. By having three separate knife drives 503A, 503B, 503C driving the knife assemblies 502A, 502B, 502C, 502D, 502E, and 502F using, for example, fluid motors 430 as shown in FIG. 4, the header frame sections 501A, 501B, and 501C can easily switch between the operation and transport positions without requiring complex mechanical connections between the knife drives 503A, 503B, and 503C and, for example, a PTO shaft (not shown) that must be disengaged or re-engaged during the switch between the operation position and the transport position. However, the knife drives 503A, 503B, and 503C can be driven by mechanical connections, such as to a PTO shaft, if desired. Further, having three separate knife drives 503A, 503B, 503C allows for the center section 501B and wing sections 501A and 501C to assume an orientation during transport which stabilizes the agricultural vehicle 100 at relatively high speeds.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
   a chassis; and
   a header carried by said chassis, said header including:
   at least three header frame sections, said at least three header frame sections comprising a center section, a first wing section adjacent a first lateral end of said center section, and a second wing section adjacent a second lateral end of said center section which is opposite said first lateral end;
   at least three knife assemblies; and
   at least three knife drives, each of said at least three knife drives being drivingly coupled to at least one of said at least three knife assemblies;
   wherein said center section carries at least one of the at least three knife assemblies, and carries at least one of said at least three knife drives at a point between the first and the second lateral ends;
   wherein said first wing section carries at least one of the at least three knife assemblies, and carries one of said at least three knife drives adjacent an end opposite said first lateral end of said center section; and
   wherein said second wing section carries at least one of the at least three knife assemblies, and carries one of said at least three knife drives adjacent an end opposite said second lateral end of said center section.

2. The vehicle according to claim 1, wherein said at least three knife assemblies comprises at least six knife assemblies, each of said knife drives being drivingly coupled to a pair of said knife assemblies.

3. The vehicle according to claim 2, wherein each pair of said knife assemblies comprises a first knife assembly and a second knife assembly, said first knife assembly defining a first knife width and said second knife assembly defining a second knife width which is equal to said first knife width.

4. The vehicle according to claim 1, wherein each of said knife drives is an oscillating drive configured to reciprocate a coupled knife assembly.

5. The vehicle according to claim 1, wherein said at least three header frame sections each define a section width, said section width of each header frame section being the same.

6. The vehicle according to claim 1, wherein at least one of said at least three header frame sections is configured to pivot such that a header width of said header changes.

7. The vehicle according to claim 1, wherein said first wing section, said second wing section, or both said first wing section and said second wing section defines a wing width which is greater than a center width of said center section.

8. The vehicle according to claim 1, wherein the center section comprises two knife assemblies, and the at least one of said at least three knife drives is centrally positioned between the two knife assemblies.

9. The vehicle according to claim 8, wherein the at least one of said at least three knife drives of the center section independently drives movement of the two knife assemblies.

10. The vehicle according to claim 1, wherein the knife drives of the center section, the first wing section, and the second wing section independently drive movement of the respective knife assemblies.

11. The vehicle according to claim 1, wherein the knife drive of the first wing section independently drives movement of the knife assemblies of the first wing section from the knife assemblies of the second wing section and the center section.

12. A header for an agricultural vehicle, comprising:
a header frame;
said at least three header frame sections comprising a center section, a first wing section adjacent a first lateral end of said center section, and a second wing section adjacent a second lateral end of said center section which is opposite said first lateral end;
at least three knife assemblies supported by said header frame; and
at least three knife drives, each of said at least three knife drives being drivingly coupled to at least one of said at least three knife assemblies;
wherein said center section carries at least one of the at least three knife assemblies, and carries at least one of said at least three knife drives at a point between the first and the second later ends;
wherein said first wing section carries at least one of the at least three knife assemblies, and carries one of said at least three knife drives adjacent an end opposite said first lateral end of said center section; and
wherein said second wing section carries at least one of the at least three knife assemblies, and carries one of said at least three knife drives adjacent an end opposite said second lateral end of said center section.

13. The header according to claim 12, wherein said at least three knife assemblies comprises at least six knife assemblies, each of said knife drives being drivingly coupled to a pair of said knife assemblies.

14. The header according to claim 13, wherein each pair of said knife assemblies comprises a first knife assembly and a second knife assembly, said first knife assembly defining a first knife width and said second knife assembly defining a second knife width which is equal to said first knife width.

15. The header according to claim 12, wherein each of said knife drives is an oscillating drive configured to reciprocate a coupled knife assembly.

16. The header according to claim 12, wherein said at least three header frame sections each define a section width, said section width of each header frame section being the same.

17. The header according to claim 12, wherein at least one of said at least three header frame sections is configured to pivot such that a header width of said header frame changes.

18. The header according to claim 12, wherein either said first wing section, said second wing section, or both said first wing section and said second wing section defines a wing width which is greater than a center width of said center section.

* * * * *